United States Patent [19]

Budde et al.

[11] Patent Number: 5,384,163

[45] Date of Patent: Jan. 24, 1995

[54] CELLULOSE ESTERS MOIDIFIED WITH ANHYDRIDES OF DICARBOXYLIC ACIDS AND THEIR USE IN WATERBORNE BASECOATS

[75] Inventors: Anna M. Budde, Livonia, Mich.; I. Daniel Sand, Jonesborough, Tenn.; Alan R. Dunn; Chung M. Kuo, both of Kingsport, Tenn.

[73] Assignee: BASF Corporation, Southfield, Mich.

[21] Appl. No.: 781,472

[22] Filed: Oct. 23, 1991

[51] Int. Cl.$^6$ ............................................. C08L 1/14
[52] U.S. Cl. ........................ 427/385.5; 427/388.2; 427/388.4; 524/38; 524/39
[58] Field of Search ............ 536/64, 65; 106/183, 106/184; 524/37, 38, 39; 427/384, 385.5, 388.2, 388.4; 428/532

[56] References Cited

U.S. PATENT DOCUMENTS

| | | | |
|---|---|---|---|
| 2,040,093 | 7/1932 | Malm et al. | 536/64 |
| 2,069,974 | 2/1937 | Schulze | 536/63 |
| 2,196,768 | 3/1938 | Hiatt | 536/64 |
| 4,136,068 | 1/1979 | Nomura et al. | 524/37 |
| 4,206,108 | 6/1980 | Simms | 524/500 |
| 4,590,265 | 5/1986 | Bogan et al. | 536/63 |
| 4,613,631 | 9/1986 | Espenscheid, deceased et al. | 106/186 |
| 4,758,645 | 7/1988 | Miyazono | 526/238.2 |
| 4,859,758 | 8/1989 | Shalati et al. | 527/313 |
| 5,182,379 | 1/1993 | Cook et al. | 536/63 |
| 5,286,768 | 2/1994 | Walker | 524/40 |

*Primary Examiner*—John Kight, III
*Assistant Examiner*—Jeffrey Culpeper Mullis
*Attorney, Agent, or Firm*—Paul L. Marshall; Anne Gerry Sabourin

[57] ABSTRACT

Novel coating compositions containing modified cellulose esters are disclosed. The modified cellulose esters contain acid functionality, permitting their dispersion in aqueous systems. The modified cellulose esters are particularly useful as rheology control agents in coatings which are applied as waterborne dispersions. The novel coating compositions are used to produce coated substrates with desirable appearance characteristics.

27 Claims, No Drawings

CELLULOSE ESTERS MODIFIED WITH ANHYDRIDES OF DICARBOXYLIC ACIDS AND THEIR USE IN WATERBORNE BASECOATS

BACKGROUND OF THE INVENTION

The present invention relates to novel coating compositions containing modified cellulose esters that are used as rheology control agents. The modified cellulose esters are particularly useful as rheology control agents in coatings which are applied as waterborne dispersions. There is currently a strong need to reduce the amount of organic solvent utilized in automotive coating formulations in order to prevent adverse environmental impacts and occupational health impacts. One method of obtaining the goal of emissions reduction is to use coating formulations in which water serves as a solvent or dispersant for polymers in the coating compositions.

A major problem in accomplishing this goal in metallic coatings is that automotive waterborne coating formulations which comprise metallic flakes have been found to exhibit undesirable appearance characteristics due to rheology problems. Without the proper rheological properties, the spraying of a waterborne metallic-flake-containing coating formulation onto a substrate results in poor appearance characteristics because the metallic flake particulates lack the proper orientation to provide the desired appearance effects. The rheology characteristics of the formulation need to be altered so that upon application of the formulation (usually via spraying), the applied formulation does not undergo any substantial amount of flow perpendicular to the surface of the substrate. The elimination of such "perpendicular flow" allows the metallic flake to remain in parallel alignment with the surface of the substrate, so that the desired appearance effects are achieved. It has been discovered that the use of the modified cellulose esters of the present invention provides a means of substantially eliminating the perpendicular flow of the metallic flake during the process of making a metallic-flake-containing coating from a waterborne coating formulation.

The closest related art of which Applicants are aware is: U.S. Pat. Nos. 4,521,565; 4,413,036; 4,451,597; 4,532,177; 4,535,132; 4,755581; 4,755,582; 4,888,372; 4,888,373; 4,442,145; 4,912,960; 4,714,634; and 4,758,645. Each of these patents will now be discussed with respect to Applicants' invention.

4,521,565 relates to an aqueous dispersion which contains a cellulose derivative. The cellulose derivatives mentioned in the '565 patent are discussed in Col. 3, lines 25–53. It should be noted that none of the derivatives mentioned in the '565 patent comprise the residue of an anhydride of a dicarboxylic acid.

U.S. Pat. Nos. 4,413,036, 4,451,597, 4,532,177, and 4,535,132 describe basecoat compositions for wet-on-wet applications. The compositions comprise a resin which is blended with a cellulose ester. It should be noted that these patents nowhere discloses any cellulose ester which has been reacted with an anhydride of a dicarboxylic acid.

U.S. Pat Nos. 4,755,581 and 4,755,582 disclose clear-coat compositions which comprise cellulose acetate butyrate. Cellulose acetate butyrate does not contain any residue of an anhydride of a dicarboxylic acid.

U.S. Pat Nos. 4,888,372 and 4,888,373 describe the use of cellulose acetate butyrate in topcoat compositions. No mention is made of a modification of the cellulose with an anhydride of a dicarboxylic acid.

U.S. Pat. No. 4,442,145 describes the use of cellulose acetate butyrate and cellulose propionate in two-component lacquers of acrylate resins and optionally blocked lacquer-grade polyisocyanates. Cellulose derivatives comprising the residue of an anhydride of a dicarboxylic acid are not mentioned.

U.S. Pat. No. 4,912,960 describes non-aqueous solvent solutions of acid-functional polymers prepared by reacting hydroxy-functional polymers with cyclic carboxylic anhydrides. The '960 patent makes no mention of substituted cellulosic compounds.

U.S. Pat. No. 4,714,634 relates to graft copolymers comprising copolymerizing a cellulose derivative bearing copolymerizable double bonding and copolymerizable monomers by the reaction of cellulose ester and mono- or di- esters of maleic or fumaric acid. U.S. Pat. No. 4,758,645 is a divisional of the '634 patent, supra.

BRIEF SUMMARY OF THE INVENTION

The present invention pertains to a coating composition comprising a cellulose mixed ester, as well as to a coated substrate having a coating thereon, which coating comprises the cellulose mixed ester of the present invention. First, with regard to the cellulose mixed ester of the present invention, the mixed cellulose ester comprises a first residue and a second residue. The first residue is a residue of a cyclic dicarboxylic acid anhydride. The first residue is, in general, present in the mixed ester in an amount of from about 3 weight percent to about 35 weight percent, based on the weight of the cellulose ester. The second residue is a residue of an oleophilic monocarboxylic acid and/or a residue of a hydrophilic monocarboxylic acid. The oleophilic monocarboxylic acid residue, if present, is present in an amount of from about 10 weight percent to about 65 weight percent, based on the weight of the cellulose ester. The hydrophilic monocarboxylic acid residue, if present, is present in an amount of from about 1 weight percent to about 45 weight percent, based on the weight of the cellulose ester. The cellulose ester has a number average molecular weight of from about 5,000 to about 100,000. The degree of substitution within the cellulose mixed ester is from about 2 to about 3, where a degree of substitution of zero represents cellulose itself and a degree of substitution of three is fully substituted cellulose. [A discussion of the degree of substitution of cellulose may be found in the Encyclopedia of Polymer Science and Engineering, Second Ed., Vol,. 4, p. 697 (© 1986 by John Wiley & Sons, Inc.), which is incorporated here by reference.] Finally, the cellulose mixed ester is partially or fully neutralized with a basifying agent.

Second, the coating composition of the present invention is a coating composition which comprises the cellulose mixed ester of the present invention. Of course, the cellulose mixed ester which is present in the paint composition of the present invention is the same cellulose mixed ester as is described immediately above.

Third, the coated substrate of the present invention pertains to a substrate coated with at least one coating layer. The coating layer(s) comprise at least one member selected from the group consisting of a cellulose mixed ester or a condensation product of a cellulose mixed ester. The cellulose mixed ester is exactly as described above regarding the cellulose mixed ester of the present invention. The condensation product is formed from the reaction of a cellulose mixed ester of the present invention with a reactant. The reactant comprises an organic compound which is reactive with at least one member selected from the group consisting of hydroxyl and carboxyl functionalities.

It is an object of the present invention to provide a new mixed ester for use as a rheology control agent for coatings formulations.

It is a further object of the present invention to provide a coating composition which comprises the novel rheology control agent.

It is a further object of the present invention to provide a coated substrate having a coating which exhibits desirable appearance characteristics obtainable by control of the rheological properties during application and/or curing of the coating.

It is a further object of the present invention that this new mixed ester be used in conjunction with a coating formulation which comprises metallic flakes.

It is a further object of the present invention that the new rheology control agent be used in a coating formulation which is a waterborne coating formulation.

It is a further object of the present invention to improve the alignment of flake pigments such as metallic flake pigments within a coating upon a substrate.

DETAILED DESCRIPTION OF THE PREFERRED EMBODIMENTS

The cellulose mixed ester of the present invention is "mixed" in that it has at least two different ester functionalities thereon. The ester functionalities are herein termed a "first residue" and a "second residue". The term "residue", as utilized herein, refers to those portions of the mixed ester which are added as a result of the reaction of a carboxylic functionality (located on a reactant) with a hydroxyl functionality which is on the cellulose molecule. The result of this reaction is the esterification of the cellulose molecule, with the residue being that portion of the reactant which resides on the cellulose ester.

The first residue is a residue of an anhydride of a dicarboxylic acid. The anhydride may be a cyclic dicarboxylic acid anhydride, or an oligomer or polymer containing the anhydride of at least one such dicarboxylic acid. The first residue is linked to the cellulose molecule with an ester functionality, and the first residue further comprises a carboxylic acid functionality. This carboxylic acid functionality allows the resulting mixed ester to be associated with a basifying agent such as a tertiary amine and then used in a waterborne coating formulation without further modification of the cellulose mixed ester. When the cellulose mixed ester is used in this way in a waterborne coating it may associate with itself or with other elements in the coating such as other polymers to impart the desired rheological properties. One such desired rheological property for a coating which contains flake pigment(s) results in an improvement in the parallel alignment of the flakes in the applied coating. It has been discovered that cellulose esters which do not have such a first residue do not impart the desired rheological properties to waterborne coating formulations, even in the case where they are carried into the aqueous media by first dissolving them in an organic solvent solution of a water dispersible polymer or dissolving them in the monomers or solvent during the polymerization of an acrylic water dispersible polymer. See Comparative Examples 9, 11, and 13.

The first residue can be formed, in general, from the reaction of any anhydride of a dicarboxylic acid with cellulose. Examples of useful anhydrides are succinic anhydride including its derivatives such as methylsuccinic anhydride, dodecenylsuccinic anhydride, and octadecenylsuccinic anhydride; phthalic anhydride including its derivatives such as tetrahydrophthalic anhydride, methyltetrahydrophthalic anhydride, hexahydrophthalic anhydride, alkylhexahydrophthalic anhydrides such as methylhexahydrophthalic anhydride, endomethylene tetrahydrophthalic anhydride, and 3-nitrophthalic anhydride; maleic anhydride including its derivatives such as citraconic anhydride; glutaric anhydride; adipic anhydride; itaconic anhydride; 5-norborene-2,3-dicaroxylic anhydride including its derivatives such as chlorendic anhydride; and diglycolic acid anhydride. Other useful anhydrides include those anhydrides having a free carboxyl group in addition to the anhydride group such as trimellitic anhydride, aconitic anhydride, 2,6,7-naphthalene tricarboxylic anhydride, 1,2,4-butane tricarboxylic anhydride, and 1,3,4-cyclopentane tricarboxylic anhydride. Additionally, any oligomeric or polymeric compounds which comprise cyclic anhydrides of dicarboxylic acids could be used. However, preferred cyclic anhydrides of dicarboxylic acids comprise one or more members selected from the group consisting of: succinic anhydride, trimellitic anhydride, glutaric anhydride, adipic anhydride, itaconic anhydride, phthalic anhydride, hexahydrophthalic anhydride, and diglycolic acid anhydride. Still more preferred anhydrides of dicarboxylic acids comprise one or more members selected from the group consisting of: succinic anhydride, glutaric anhydride, adipic anhydride, phthalic anhydride, hexahydrophthalic anhydride, and diglycolic acid anhydride. The most preferred anhydride of a dicarboxylic acid is succinic anhydride.

In general, the first residue makes up from about 3 weight percent to about 35 weight percent of the mixed cellulose ester. These weight percent values are based on the weight of the mixed ester. Preferably the first residue is present in an amount of from about 3 weight percent to about 17 weight percent, based on the weight of the mixed ester. Still more preferably, the first residue is present in an amount of from about 8 weight percent to about 17 weight percent, based on the weight of the mixed ester. The most preferable amount of first residue present in the mixed ester depends upon the particular coating composition which is being formulated, because it affects the interactions of the mixed cellulose ester with the other components as well as the stability of the mixed cellulose ester in the particular dispersion.

The second residue is a residue of an oleophilic monocarboxylic acid and/or a hydrophilic monocarboxylic acid. As with the first residue, the second residue is linked to the cellulose molecule with an ester functionality. However, in contrast to the first residue, the second residue does not further comprise a carboxylic acid functionality. The presence of the second residue on the mixed ester has the effect of promoting interactions with other components in the coating composition, particularly with any other polymer(s) present, to effect desirable rheological characteristics. In this regard, its function is similar to that of the first residue. However, the oleophilic and hydrophilic properties of the second residue may be changed and balanced to suit a particular coating composition. Because of the nature of the first residue, it contributes strongly to the hydrophilicity of the mixed cellulose ester.

The second residue can be formed, in general, from the reaction of (1) any oleophilic monocarboxylic acid and/or any hydrophilic monocarboxylic acid, with (2) cellulose. In general, the second residue makes up from about 1 weight percent to about 95 weight percent, based on the weight of the mixed cellulose ester. However, residues of oleophilic monocarboxylic acids, if present, should in general be present in an amount of from about 10 weight percent to about 65 weight percent, based on the weight of the mixed ester. Furthermore, residues of hydrophilic monocarboxylic acids, if present, should in general be in an amount of from about 1 weight percent to about 45 weight percent based on the weight of the mixed ester.

Preferred oleophilic monocarboxylic acids comprise at least one member selected from the group consisting of monocarboxylic acids having at least 3 carbon atoms therein (as well as derivatives of such monocarboxylic acids). Still more preferred oleophilic monocarboxylic acids comprises at least one member selected from the group consisting of: butyric acid, propionic acid, valeric acid, hexanoic acid, and other aliphatic monocarboxylic acids. The selection of the most preferred oleophilic monocarboxylic acid depends upon the particular formulation being produced because of its contribution to the interactions which bring about the rheological properties desired in the coating. Among the most preferred oleophilic monocarboxylic acids are propionic acid and butyric acid.

The amount of oleophilic monocarboxylic acid residue present in the mixed ester is, as stated above, generally from about 10 weight percent to about 65 weight percent, based on the weight of the mixed ester. Preferably, the amount of oleophilic monocarboxylic acid residue present is from about 30 weight percent to about 55 weight percent. Still more preferably, the amount of oleophilic monocarboxylic acid residue is from about 30 weight percent to about 46 weight percent. The selection of the most preferred amount of oleophilic monocarboxylic acid residue present depends upon the particular coating formulation being produced, the particular oleophilic monocarboxylic acid chosen, and the types and amounts of the other residues on the mixed cellulose ester.

Preferably, the hydrophilic monocarboxylic acid residue comprises acetic acid residues. The selection of the most preferred hydrophilic monocarboxylic acid depends likewise upon the particular formulation being produced, the amount of hydrophilic monocarboxylic acid used, and the types and amounts of the other residues on the mixed cellulose ester. Most preferably, the hydrophilic monocarboxylic acid residue is acetic acid residue.

The amount of hydrophilic monocarboxylic acid residue present in the mixed ester is, as stated above, generally from about 1 weight percent to about 45 weight percent, based on the weight of the mixed ester. Preferably, the amount of hydrophilic monocarboxylic acid residue present is from about 1.5 weight percent to about 15 weight percent. Still more preferably, the amount of hydrophilic monocarboxylic acid residue is from about 7 weight percent to about 15 weight percent. The selection of the most preferred amount of hydrophilic monocarboxylic acid residue present depends upon the particular coating formulation being produced, the particular hydrophilic monocarboxylic acid chosen, and the types and amounts of the other residues on the mixed cellulose ester.

In general, the mixed cellulose ester of the present invention can be further characterized as having a number average molecular weight of from about 5,000 to about 100,000, as determined by standard methods of gel permeation chromatography as measured against polystyrene standards. Preferably, the number average molecular weight is from about 10,000 to about 100,000. Most preferably, the number average molecular weight is about 10,000 to about 30,000.

In general, the mixed cellulose ester of the present invention can be further characterized as having a degree of substitution of from about 2 to about 3. Preferably, the degree of substitution is from about 2.2 to about 3. Most preferably, the degree of substitution is about 2.5 to about 3.

In general, the mixed cellulose ester of the present invention is neutralized partially or fully with a basifying agent. The basifying agent is preferably a tertiary amine. The tertiary amine employed is preferably one which will be volatilized during the curing of the coating and will not remain in the cured coating. One preferred amine is dimethylethanolamine.

The coating composition of the present invention is a coating composition which comprises the mixed ester of the present invention. In addition to the mixed ester as a rheology control agent, the coating composition preferably further comprises materials chosen from the group consisting of polymers, crosslinkers, water, organic solvents, basifying agents, flake pigments, other pigments, and additives.

Examples of polymers that would be useful in the coating compositions of the present invention would be anionically or nonionically stabilized water-dispersible polymers such as acrylics, polyesters, polyurethanes, alkyds, and other polymers commonly used to make coatings. The anionic modification is usually accomplished by either preparing the polymer with an appropriate monomer containing a carboxyl group which does not participate in the polymerization reaction, or by adducting the formed polymer in such a way as to introduce the carboxyl group onto the polymer. Nonionically stabilized polymers may usefully be thought of as hydrophilic/hydrophobic block copolymers, as the stabilizing nonionic groups are necessarily much larger than the simple carboxyl group on an anionically stabilized polymer. The hydrophilic, nonionic stabilizing block usually comprises a polyether such as polyethylene oxide; a polyvinylpyrrolidone; a polyalcohol such as polyvinylalcohol; or compounds of similar hydrophilicity. When used for the purpose of nonionically stablilizing a polymer in water, these compounds are usually of molecular weights of from about 400 to about 40,000. The polymers may also be stabilized by emulsifiers, such as those emulsifiers commonly used in emulsion polymerization.

One preferred polymer is a polyurethane. Descriptions of anionically and nonionically stabilized polyurethanes and their uses in coatings are contained in U.S. Pat. Nos. 4,791,168 and 4,794,147, respectively, which are hereby incorporated by reference. Another preferred polymer is an acrylic. Water-dispersible acrylics are well-known in the art and may be prepared, for example, by copolymerizing an unsaturated monomer with carboxyl or polyether functionality.

In order to form a cured coating, the cellulose mixed ester and/or the polymer is usually crosslinked utilizing a crosslinker with at least two functional sites which are reactive with the cellulose mixed ester and/or the polymer. The crosslinker may be either monomeric or polymeric in nature. Examples of materials which are useful in waterborne coating compositions as crosslinkers are aminoplast crosslinkers, polyepoxides, polyacids, polyanhydrides of carboxylic acids, polyols, polyisocyanates, blocked polyisocyanates (including blocked isocyanurates or blocked biurets of isocyanates), and any compatible mixture thereof. Blocked polyisocyanates have at least two isocyanate groups, and the isocyanate groups are blocked by reaction with active hydrogen bearing blocking agents. One common type of blocking agent is oximes, such as acetone oxime, methyl isobutyl ketoxime, acetaldehyde oxime and the like. Representative isocyanate crosslinkers and additional blocking agents are described in U.S. Pat. No. 4,794,147.

In one preferred embodiment, the hydroxyl sites on the cellulose mixed ester and/or on the polymer are used in the crosslinking reaction The amount of crosslinker used can range from about 10 to about 50 percent by weight of the reactive components. Aminoplast crosslinkers and blocked or unblocked polyisocyanates are suitable crosslinkers for the hydroxyl sites. The aminoplast crosslinkers are aldehyde condensation products of melamine, glycoluril, urea, benzoguanamine, or a similar compound. Generally, the aldehyde employed is formaldehyde, although useful products can be made from other aldehydes, such as acetaldehyde, benzaldehyde, and others. Condensation products of melamine or urea are the most common and are preferred, but products of other amines and amides in which at least one amine group is present can also be employed. These aldehyde condensation products contain methylol groups or similar alkylol groups, depending upon the particular aldehyde employed. If desired, these methylol groups can be etherified by reaction with an alcohol. Various alcohols are employed for this purpose, including essentially a monohydric alcohol, although the preferred alcohols are methanol, isobutanol, butanol, and similar lower alkanols having eight carbons or less.

The aminoplast crosslinker can be monomeric or polymeric. Preferably a polymeric melamine is used as a crosslinker in compositions which have significant anionic stabilization. One useful crosslinker is a methoxy/butoxy methyl melamine (available as Resimene 755 from Monsanto Chemical Co., of Springfield, Mass.). Another useful crosslinker is methoxy/imino melamine (available as Cymel 327 from American Cyanamid Co., Wayne, N.J.). Another useful crosslinker is butylated melamine-formaldehyde resin (available as Cymel 1158 from American Cyanamid Co., Wayne, N.J.).

Alternatively, carboxyl sites on the cellulose mixed ester and/or the polymer may be reacted with the crosslinker. A polyepoxide may be employed for reaction with carboxyl groups. Suitable monomeric epoxide compounds are di-and triglycidyl ethers of diols, triols and bisphenols or derivatives of cyclohexene oxides. Oligomeric or polymeric crosslinkers with two or more oxirane groups may also be used.

It is not necessary that the mixed cellulose ester take part in a crosslinking reaction to form the cured coating. The coating may be cured by other means, such as irradiation of a UV-curable composition; oxidation of an alkyd composition; simple drying of a thermoplastic coating composition; and other known methods which can produce useful coatings.

The cellulose mixed ester, polymer and crosslinker may be combined along with other reactive or non-reactive materials in a waterborne basecoat composition and applied to the substrate and then cured as described in U.S. Pat. No. 4,791,168 and U.S. Pat. No. 4,794,147. The cellulose mixed ester may be used in a solventborne basecoat composition such as those described in the patents mentioned in the "Background of the Invention", hereinabove. The cellulose mixed ester may be used to advantage also in a clearcoat or one-layer topcoat composition such as those known in the art. A suitable grind polymer may be used to incorporate pigments into the basecoat or topcoat by methods described in the referenced patents or by other commonly known methods of producing pigment grind pastes. The cellulose mixed esters are particularly useful in formulations which comprise flake pigments. The preferred flake pigments are aluminum metal flakes and micas. Preferred aluminum flake pigments are available from Silberline Corp., Lansford, Pennsylvania or from Eckart Werke, Guentersthal. Germany. Preferred micas are available from the Mearl Corp., New York, N.Y. and EM Chemicals, Hawthorne, N.Y.

Additives which may typically be found in the various types of coating compositions may be, for example, acid catalysts, tin catalysts or other metal catalysts; light stabilizers such as hindered amines or UV absorbers; antioxidants; wetting agents; slip agents; other rheology control agents; and other materials which may be added without impairing the usefulness of the mixed cellulose ester of the invention.

The mixed cellulose ester may be incorporated into the coating composition by preferably forming a solution which comprises the cellulose mixed ester in an organic solvent or a mixture of an organic solvent and water. Preferred organic solvents are glycol ethers, glycol ether acetates, ketones, esters, alcohols, and mixtures thereof. The solution may further comprise a polymer or crosslinker. In the case of a waterborne coating composition the mixed cellulose ester is preferably partially or fully neutralized with a basifying agent such as a tertiary amine. One preferred amine is dimethylethanolamine. The solution of the cellulose mixed ester is then incorporated into a coating which may include any or all of the other components discussed hereinabove.

The coated substrate of the present invention comprises at least one coating layer adhered to a substrate. The coating layer comprises at least one member selected from the group consisting of (1) the mixed cellulose ester of the present invention, and (2) a condensation product formed by the reaction of the cellulose ester of the present invention with a reactant. The reactant comprises an organic compound which is reactive with at least one member selected from the group consisting of hydroxyl and carboxyl functionalities. The reactant usually functions as a crosslinker.

In general, the substrate which is coated can be metallic, plastic, wood, ceramic, paper, etc. Preferably, the substrate is metallic or plastic, and is preferably for use in an automotive body. The substrate is preferably "precoated"(i.e. coated with primers or any other desired coating which need not incorporate the mixed ester of the present invention) before a coating formulation of the present invention is applied thereto. However, upon application of the coating formulation of the present invention to a substrate, the formulation is thereafter dried (and preferably cured).

The groups on the cellulose ester which may participate in a crosslinking reaction are (1) the carboxylic acid group present on the first residue of the mixed ester or (2) residual hydroxyl groups which were not reacted in preparing the cellulose mixed ester. Upon drying (and curing, preferably), the mixed cellulose ester may react with any organic compounds present that are reactive with the hydroxyl and carboxyl functionalities thereon. The reaction results in the formation of a condensation product.

The condensation product can thus be understood as the reaction product of the mixed cellulose ester of the present invention and an organic compound which is reactive with at least one member selected from the group consisting of hydroxyl and carboxyl functionalities. The mixed cellulose ester of the present invention has already been described in detail above. The hydroxyl-and carboxyl-reactive organic compounds which are reactive with the mixed cellulose ester comprise: crosslinkers such as monomeric melamine compounds, polymeric melamine compounds, other aminoplast resins, polyisocyanates and blocked polyisocyanates, and polyepoxides; and other organic compounds which are reactive with the mixed cellulose ester but which do not function as crosslinkers [e.g. reactive compounds with average functionality less than 2]. Of course, not all of the carboxylic groups or hydroxyl groups on the mixed ester necessarily undergo the condensation reaction. If no such reactive organic compounds are available, it is even possible that none of the carboxylic groups or hydroxyl groups on the mixed ester undergo the condensation reaction. Accordingly, the coating on the substrate may comprise:

(1) the mixed cellulose ester of the present invention, and/or (2) the condensation product formed by the reaction of the mixed ester of the present invention with a hydroxyl-reactive or carboxyl-reactive compound present in the coating.

In one preferred embodiment the cellulose mixed ester, polymer and crosslinker are combined along with other reactive or non-reactive materials in a pigmented waterborne basecoat composition as described and applied to the substrate. The basecoat is preferably applied by spray application. The applied basecoat is allowed to partially dry. The basecoat layer is then overcoated with an unpigmented coating layer which comprises a composition known in the art as a clearcoat. The two applied layers are then dried and, preferably, cured simultaneously.

Coated substrates of the present invention can be evaluated for the degree of metallic flake orientation which is produced. The basic criteria which are considered to be of greatest importance in evaluating the quality of metallic effect in a metallic-flake-containing coating are: (1) the brightness if the coating as viewed at an angle of 90 degrees to the plane of the surface, (2) the brightness of the coating when viewed at oblique angles, and (3) the uniformity of the metallic effect (i.e. lack of mottle). Properties (1) and (2) can be measured via goniospectrophotometry, using for example, a Model GPX-111 goniospectrophotometer (available from Datacolor, Princeton, N.J.). This instrument has a fixed incident light angle of 45°. The detector for the reflection intensity can be varied between 20° and 70° from the specular reflectance angle. It was determined that better metallic effect can be correlated to a greater decrease in the reflected intensity at low angles from specular. A relation was developed which adequately differentiated between observed metallic effects of standard panels. This relation is described by the equation $$C = [(L^*25° - L^*45°)/(L^*45° - L^*70°)] \times 100$$

where $L^*$ indicates the light intensity in color space at the angle of measurement. This measurement is quantitative and reproducible. The method is used in the examples to indicate the degree of metal effect evident in the examples.

A typical procedure for the preparation of a cellulose ester (e.g. a cellulose acetate butyrate, often abbreviated as CAB) can be found in U.S. Pat. No. 4,532,177. Note in particular Column 5, line 30 through Column 6, line 4, which are herein incorporated by reference.

Cellulose acetate butyrate succinates are sold by Eastman Chemical Co. of Kingsport, Tenn. It has been conceived that these succinate-substituted CAB's are produced by reacting a cellulose acetate butyrate having a hydroxyl functionality with succinic anhydride. Reactions between hydroxyl groups and acid anhydrides, such as this reaction, can typically be carried out under mild conditions (i.e. room temperature to 150° C. and atmospheric pressure).

EXAMPLE 1

Preparation of a Polyurethane Dispersion Comprising a Cellulose Ester

A CAB-succinate having a base cellulose ester content of approximately 47% butyryl and 2% acetyl by weight, with a hydroxyl content of approximately 4.3% by weight (or 3 hydroxyl groups per four anhydroglucose units) was adducted with succinic anhydride to attain an acid number of 49 mg KOH/g. The CAB succinate had 8.8% succinic anhydride residue by weight.

A suitable reactor was loaded with 242.7 grams (0.357 eq.) polyester, 15.5 grams (0.231 eq.) dimethylolpropionic acid, 3.9 grams (0.075 eq.) neopentyl glycol, 84.6 grams (0.762 eq.) isophorone diisocyanate, and 83.2 grams propylene glycol methyl ether acetate, so that a mixture was formed. [The polyester was the reaction product of 86.0 parts isophthalic acid, 302.5 parts dimer fatty acid (Empol 1010 from Emery Group, Henkel Corporation, of Cincinnati, Ohio), and 160.5 parts 1,6-hexanediol. The theoretical weight per hydroxyl was 680.] The mixture was heated under inert gas to 130° C. The temperature was maintained at 130° C. for four hours, after which time the isocyanate content was determined to be 0.148 meq./gram (wt/NCO about 5450). Trimethylolpropane (13.2 grams, which is 0.295 eq.) was then added to the reactor. The reaction was then allowed to proceed for one hour. The inert gas and heat were then turned off and the polyurethane solution was cooled to 82° C. A mixture of 16.2 grams dimethylethanolamine, 157.6 grams deionized water, and 34.6 grams isopropanol was added, followed by 79.0 grams methyl ethyl ketone. 90.0 grams of the cellulose mixed ester was added over a period of about 45 minutes. The initial temperature was 50° C., but the temperature increased during the addition to 70° C. The solution was allowed to mix for another 25 minutes. A dispersion was then formed with the addition of 1846 grams deionized water over a period of about ten minutes. The measured solids content (non-volatiles, herein termed "NV") was 16.94% and the measured acid number (herein termed "AN") was 27.9 mg KOH per g. NV.

EXAMPLE 2

Preparation of a Polyurethane Dispersion Without a Cellulosic Ester

A suitable reactor was loaded with 630.0 grams (0.926 eq.) of the polyester utilized in Example 1, 38.3 grams (0.572 eq.) dimethylolpropionic acid, 12.8 grams (0.246 eq.) neopentyl glycol, 220.5 grams (1.985 eq.) isophorone diisocyanate, 131.9 grams methyl propyl ketone and 52.1 grams methyl ethyl ketone. The mixture was heated under inert gas to 107° C. The temperature was maintained at 107° C. for four hours, after which time the isocyanate content was determined to be 0.24 meq./gram. Trimethylolpropane (38.2 grams, 0.853 eq.) was then added to the reactor. The reaction was allowed to proceed for one hour. The inert gas and heat were then turned off and the polyurethane solution was cooled to 100° C. A mixture of 25.5 grams dimethylethanolamine and 111.0 grams butanol was added. A dispersion was then formed with the addition of 2196.2 grams deionized water. The measured solids content (non-volatiles, NV) was 27.1% and the measured acid number (AN) was 19 mg KOH per g. NV.

EXAMPLES 3–5

Waterborne Paint Comprising Cellulosic Ester Exhibiting Desirable Metallic Appearance A dispersion of Laponite RD (2% by weight, available from Laporte, Inc., Saddlebrook, N.J.), a synthetic sodium lithium magnesium silicate hectorite clay was prepared in deionized water, with stirring. The dispersion was then mixed with additional ingredients, in parts by weight, in order to form a mixture, as follows:

| Material | (% NV) | 3 | 4 | 5 |
|---|---|---|---|---|
| Laponite dispersion | (2) | — | — | 120 |
| Cymel 327[1] | (90) | 26.7 | 26.7 | 26.7 |
| Ethylene glycol monobutyl ether | (0) | 12.0 | 12.0 | 12.0 |

[1]Cymel 327 is a melamine crosslinker available from American Cyanamid Co., Wayne, N.J.

The following were added to the mixture:

| Example | (% NV) | 3 | 4 | 5 |
|---|---|---|---|---|
| The Dispersion of Example 1 | (16.94) | — | 710.1 | 710.1 |
| The Dispersion of Example 2 | (27.1) | 355.1 | — | — |
| Deionized Water | (0) | 200.0 | 270.0 | 230.0 |
| N-Ethyl Morpholine | (0) | 2.5 | 2.9 | 2.3 |

The addition of these materials resulted in the formation of a resin mixture.

The following materials were then mixed to form the aluminum-flake-containing slurry, and then were added to the resin mixture:

| Example | (% NV) | 3 | 4 | 5 |
|---|---|---|---|---|
| Hydrolac W8487[2] | (65) | 35.1 | 35.1 | 35.1 |
| 2-Hexyloxyethyl phosphate ester solution[3] | (0) (15.0 in Ethylene glycol monobutyl ether) | 6.9 | 6.9 | 6.9 |
| Ethylene glycol monobutyl ether | (0) | 18.0 | 18.0 | 18.0 |
| Viscosity | (Fisher #2 cup, sec.) | 14 | 30 | 44 |
| pH | | 8.05 | 8.02 | 7.92 |

[2]Hydrolac W8487 was obtained from Eckart Werke, Guentersthal, Germany and was an aluminum flake pigment which was 65% nonvolatiles (NV) by weight and had been chemically passified for use in water.
[3]2-Hexyloxyethyl phosphate ester is available as Phosphate ester VC3419 from Mobile Chemical Co., Edison, NJ)

Precoated steel panels were sprayed at 79° C./75% relative humidity with the copositions to a dry basecoat thickness of 0.5–0.7 mils. The panels were flashed for 3–5 minutes in a forced air oven set at 120° F. and then clear coated with a solventborne clearcoat formulation. A second panel was prepared without the clear coat. The panels were baked for 30 minutes in a 250° F. oven. The panels were then judged for metallic effect:

| C value, goniospectrophotometer | | |
|---|---|---|
| | Example | |
| | 3 | 4 | 5 |
|---|---|---|---|
| base coat only | 172* | 186 | 192 |
| Clear coated panel | 157 | 150 | 180 |

*Unacceptable appearance due to mottling

EXAMPLES 6–8

Increased Control of Aluminum Flake Orientation, as a Result of an Increased Level of CAB-Succinate in a Coating Composition A CAB-succinate having a base cellulose ester content of approximately 35 weight percent butyryl and 13 weight percent acetyl, and a hydroxyl content of approximately 4.3 weight percent (or 3 hydroxyl groups per four anhydroglucose units), was adducted with succinic anhydride to attain an acid number of 92 mg KOH/g (i.e. 16.5 weight percent succinic anhydride residue). A salted solution of the CAB-succinate was formed by stirring together 75.0 grams of the CAB-succinate, 75.0 grams acetone, 75.0 grams isopropanol, and 11.2 grams dimethylethanolamine.

A grind paste of talc was separately prepared. The grind paste contained 9.5 weight percent talc, 5.1 weight percent polyurethane grinding resin, and 8.71 weight percent Cymel 327 (The paste had a fineness of NS=6.5 on Hegman grind guage).

An aluminum slurry was prepared by mixing 142.5 grams of aluminum pigment (Silberline SS-5251 AR, 62 weight percent NV, obtained from Silberline Corp., Lansford, Pa.), 143.5 grams polyester (the reaction product of 182 parts dimer fatty acid {Emery Group, Henkel Corporation, of Cincinnati, Ohio}, 179 parts 1,6-hexanediol, 52 parts isophthalic anhydride, and 70 parts trimellitic anhydride, in a mixture of ethylene glycol butyl ether and butanol at 72.5 weight percent NV), 104.0 grams ethylene glycol butyl ether, 2.6 grams dimethylethanol amine, and 49.4 grams deionized water.

| | Example | | |
|---|---|---|---|
| | 6 | 7 | 8 |

Melamine was added to the cellulose mixed ester solution:

-continued

| | Example | | |
|---|---|---|---|
| | 6 | 7 | 8 |
| Cellulose solution (parts by weight) | 15.7 | 21.2 | 31.5 |
| Cymel 327 (parts by weight) | 6.3 | 6.3 | 6.3 |
| Then the following were added: | | | |
| Polyurethane Dispersion from Example 2 (parts by weight) | 101.2 | 101.2 | 101.2 |
| Deionized Water (parts by weight) | 203.2 | 398.2 | 698.2 |
| Then the talc grind paste was added: | | | |
| Talc grind paste (parts by weight) | 28.3 | 28.3 | 28.3 |
| Deionized water (parts by weight) | 100.5 | 15.0 | 65.6 |
| The mixture was then filtered through a 5 micron filter to remove any unsolubilized material. The aluminum pigment slurry was then added to the mixture. | | | |
| Aluminum pigment slurry (parts by weight) | 42.5 | 42.5 | 42.5 |
| The pH and viscosity were then measured for each sample: | | | |
| Viscosity (Fisher #2 cup, seconds) | 17 | 30 | 28 |
| pH | 7.99 | 7.72 | 8.00 |

Precoated steel panels were then sprayed to a dry basecoat thickness of 0.5–0.7 mils with one of the compositions from Examples 6, 7, pr 8. The panels were flashed for 3–5 minutes in a forced air oven set at 120° F and then overcoated with a solventborne clearcoat formulation. A second panel was prepared without the clearcoat. The panels were baked for 30 minutes in a 250° F. oven. The panels were then judged for metallic effect:

| | Example | | |
|---|---|---|---|
| | 6 | 7 | 8 |
| C value, goniospectrophotometer: | | | |
| basecoat only panel | 180 | 180 | 210 |
| Clearcoated panel | 180 | 170 | 195 |

As can be seen by comparing the goniospectrophotometer results of Example 3 with the results of Examples 4–8, it is clear that the use of the mixed cellulose ester of the present invention improves the metallic effect exhibited by the resulting coating. A higher goniospectrophotometer C value relates to a higher metallic effect. [Refer to the description of use of goniospectrophotometer, hereinabove.]

EXAMPLE 9

Comparative Example Of Dispersion Formed With A Cellulose Ester Lacking The Modification With An Anhydride Of A Dicarboxylic Acid A suitable reactor was loaded with a mixture of 212 g. ethylene glycol monobutyl ether, 34 g. deionized water, and 75 g. cellulose acetate butyrate (available as CAB553-0.4 from Eastman Chemical Co., Kingsport, Tenn.). A mixture of 85 g. hydroxyethyl acrylate, 85 g. 2-ethylhexyl methacrylate, 25.5 g. acrylic acid, 46.8 g. styrene, 182.7 g. butyl acrylate, and 7.5 g. tert-butyl peroxy 2!ethylhexanoate was prepared in a separate container. 85 g. of the prepared mixture was loaded to the reactor. The reactor was heated under inert gas to a reflux temperature of 104° C. The relux was maintained for 30 minutes. The rest of the prepared monomer mixture was then added uniformly over two hours. At the end of the add period the temperature was 107° C. After maintaining the reflux for an additional 30 minutes, a mixture of 3 g. of tert-butyl peroxy 2-ethylhexanoate and 12.8 g. ethylene glycol monobutyl ether was added. The batch was then held at reflux for an additional three hours to complete the conversion of the monomers. At the end of the hold period a mixture of 31.8 g. of N-ethyl morpholine and 15 g. of deionized water was introduced to the reactor. The contents of the reactor were stirred for a few minutes until homogenous. A dispersion of the contents was then formed by the addition of 1100 g. of deionized water.

EXAMPLE 10

A dispersion was prepared in the same manner as Example 9, except that no cellulose acetate butyrate was added.

EXAMPLES 11 and 12

Waterborne Paint Prepared From Examples 9 and 10 To Illustrate The Lack Of Effect Of A Cellulose Ester Lacking The Modification With An Anhydride Of A Dicarboxylic Acid A slurry of the aluminum pigment was formed by mixing together the following materials:

| Material | (% NV) | 11 | 12 |
|---|---|---|---|
| Aluminum pigment[4] | (62) | 32.3 | 32.3 |
| 2-Hexyloxyethyl phosphate ester solution | (15.0 in Ethylene glycol monobutyl ether) | 6.2 | 6.2 |
| Ethylene glycol monobutyl ether | (0) | 27.5 | 27.5 |
| Cymel 1158[5] | (80) | 25.0 | 25.0 |

To the mixture, next were added:

| Material | (% NV) | 11 | 12 |
|---|---|---|---|
| The Dispersion of Example 9 | (26.1) | 306.1 | — |
| The Dispersion of Example 10 | (30.4) | — | 262.8 |
| Deionized Water | (0) | 148.4 | 131.0 |
| N-Ethyl Morpholine | (0) | 5.0 | 6.1 |
| Viscosity | (Fisher #2 cup, sec.) | 43 | 42 |
| pH | | 8.03 | 7.88 |

[4]Silberline SS-5251 AR, 62 weight percent NV, obtained from Silberline Corp., Lansford, Pennsylvania
[5]Cymel 1158 is a melamine crosslinker available from American Cyanamid Co., Wayne, NJ Precoated steel panels were sprayed with the compositions of the examples to attain a dry basecoat thickness of 0.5–0.7 mils. The panels were flashed for 3–5 minutes in a forced air oven set at 120° F. and then clearcoated with a solventborne clearcoat formulation. A second panel was prepared without the clearcoat. The panels were baked for 30 minutes in a 250° F. oven. The panels were then judged for metallic effect:

C value, goniospectrophotometer

| | Example | |
|---|---|---|
| | 11 | 12 |
| Base coat only panel | 160 | 165 |
| Clear coated panel | <150 | <150 |

EXAMPLE 13

A suitable reactor was loaded with 1400 grams (2.017 eq.) polyester, 86 grams (1.284 eq.) dimethylolpropionic acid, 25.4 grams (0.488 eq.) neopentyl glycol, 489.2 grams (4.403 eq.) isophorone diisocyanate, 200 grams methyl ethyl ketone and 400 grams propylene glycol methyl ether acetate, so that a mixture was formed. [The polyester was the reaction product of 143 parts adipic acid, 143 parts dimer fatty acid (Empol 1010 from Emery Group, Henkel Corporation, of Cincinnati, Ohio), and 176 parts 1,6-hexanediol. The weight per hydroxyl was 694.] The mixture was heated under inert gas to reflux, 122° C. The temperature was maintained at reflux for four and a half hours, after which time the isocyanate content was determined to be 0.24 meq./gram. The inert gas and heat were then turned-off and the polyurethane solution was cooled to 108° C. Diethanolamine (64.3 grams, which is 0.6112 mol.) was then added to the reactor with thorough mixing. 40 grams dimethylethanolamine were mixed in, followed by 192 grams isopropanol.

A portion of the resulting polyurethane solution was dispersed in water by this process: 372 grams of the polyurethane solution 3 0 were loaded to a suitable reactor and heated to 80° C. The polyurethane was then dispersed by adding 538 grams of deionized water over a ten minute period of time.

A portion of the resulting polyurethane solution was used to dissolve a cellulose acetate butyrate and a dispersion of the solution was then formed by this process: A mixture of 450 grams of the polyurethane solution formed above and 54.8 grams of CAB 531-1 (available from Eastman Chemicals, Kingsport, Tenn.) was heated in a suitable reactor to reflux (96° C.). The reactor was heated and the mixture was stirred for about 15 minutes to completely dissolve the CAB 531-1. The solution was cooled to 98° C. and then 650 grams of deionized water were added over about ten minutes to form a stable dispersion of the polyurethane and the cellulose acetate butyrate.

A waterborne coating composition was prepared according to Example 3 for each of the two dispersions. In the case of the CAB 531-1 containing dispersion a sufficient amount was used so that the polyurethane content of the two paints were equal. The paints were applied and cured in the same manner as was Example 3. A comparison of the two panels showed that the CAB 531-1 incorporated in this way had no effect on the metallic appearance. Both panels had goniospectrometer C values less than 150.

We claim:

1. A thermosetting coating composition comprising a cellulose mixed ester having a number average molecular weight of between 5,000 and 100,000, and reactive components comprising a crosslinker having at least two functional sites capable of reacting during curing of the coating, wherein the cellulose mixed ester comprises:
   A. a first residue that is a residue of a cyclic dicarboxylic acid anhydride, present in an amount of from 3 to 35 weight percent of the cellulose ester;
   B. a second residue that is at least one member selected from the group consisting of:
      i. an oleophilic monocarboxylic acid residue that is at least one member selected from the group consisting of residues of monocarboxylic acids having at least 3 carbon atoms, wherein the oleophilic monocarboxylic acid residue is present in an amount of from 10 to 65 weight percent of the cellulose ester;
      ii. a hydrophilic monocarboxylic acid residue that is a residue of acetic acid wherein the hydrophilic monocarboxylic acid residue is present in an amount of from 1 to 45 weight percent of the cellulose ester,
   wherein a degree of substitution within the cellulose mixed ester is from 2 to 3.

2. A coating composition as described in claim 1, wherein the coating composition further comprises water and a basifying agent to form a waterborne coating composition.

3. A coating composition as described in claim 2, wherein the basifying agent is a tertiary amine.

4. A coating composition as described in claim 1, wherein the second residue of the cellulose mixed ester comprises both the oleophilic monocarboxylic acid residue and the hydrophilic monocarboxylic acid residue.

5. A coating composition as described in claim 1, wherein the oleophilic monocarboxylic acid residue has at least one member selected from the group consisting of bytyryl residues, propionyl residues, valeryl residues, and hexanoyl residues.

6. A coating composition as described in claim 1, wherein the coating composition further comprises a flake pigment.

7. A coating composition as described in claim 1, wherein the first residue of the cellulose mixed ester is the residue of at least one member selected from the group consisting of: succinic anhydride, trimellitic anhydride, glutaric anhydride, adipic anhydride, itaconic anhydride, phthalic anhydride, hexahydrophthalic anhydride, and diglycolic acid anhydride.

8. A coating composition as described in claim 1, wherein the first residue of the cellulose mixed ester is the residue of at least one member selected from the group consisting of: succinic anhydride, glutaric anhydride, adipic anhydride, phthalic anhydride, hexahydrophthalic anhydride, and diglycolic acid anhydride.

9. A coating composition as described in claim 1, wherein the cellulose mixed ester comprises:
   A. a succinic acid residue content of from 3 to 17 weight percent of the cellulose mixed ester,
   B. an acetyl residue content of from 1.5 to 15 weight percent of the cellulose mixed ester, and
   C. a butyryl residue content of from 25 to 55 weight percent of the cellulose mixed ester.

10. A coating composition as described in claim 1, wherein the cellulose mixed ester comprises:
   A. a succinic acid residue content of from 8 to 17 weight percent of the cellulose mixed ester,
   B. an acetyl residue content of from 7 to 15 weight percent of the cellulose mixed ester, and
   C. a butyryl residue content of from 25 to 46 weight percent of the cellulose mixed ester.

11. A coating composition as described in claim 1, wherein the cellulose mixed ester comprises:
   A. a succinic acid residue content of about 16 weight percent of the cellulose mixed ester,
   B. an acetyl residue content of about 11 weight percent of the cellulose mixed ester, and
   C. a butyryl residue content of about 27 weight percent of the cellulose mixed ester.

12. A coating composition as described in claim 1, wherein the cellulose mixed ester comprises:
   A. a succinic acid residue content of about 9 weight percent of the cellulose mixed ester,
   B. an acetyl residue content of about 1 weight percent of the cellulose mixed ester, and C. a butyryl residue content of about 42 weight percent of the cellulose mixed ester.

13. A coating composition as described in claim 1, wherein the cellulose mixed ester comprises 5 to 25 weight percent based on the total weight of cellulose mixed ester and reactive components.

14. A coating composition as described in claim 1, wherein the cellulose mixed ester comprises 5 to 15 weight percent based on the total weight of cellulose mixed ester and reactive components.

15. A coating composition as described in claim 1, wherein the cellulose mixed ester comprises 8 to 13 weight percent based on the total weight of cellulose mixed ester and reactive components.

16. A coated substrate, wherein the coating comprises at least one coating layer comprising the product obtained by thermally curing the composition described in claim 1.

17. A process for coating a substrate, the process comprising the steps of:
   A. Making a thermosetting coating composition comprising a cellulose mixed ester having a number average molecular weight of between 5,000 and 100,000, and reactive components comprising a crosslinker having at least two functional sites capable of reacting during curing of the coating, wherein the cellulose mixed ester comprises:
      i. a first residue that is a residue of a cyclic dicarboxylic acid anhydride, present in an amount of from 3 to 35 weight percent of the cellulose ester;
      ii. a second residue that is at least one member selected from the group consisting of:
         a. an oleophilic monocarboxylic acid residue that is at least one member selected from the group consisting of residues of monocarboxylic acids having at least 3 carbon atoms, wherein the oleophilic monocarboxylic acid residue is present in an amount of from 10 to 65 weight percent of the cellulose ester;
         b. a hydrophilic monocarboxylic acid residue that is a residue of acetic acid, wherein the hydrophilic monocarboxylic acid residue is present in an amount of from 1 to 45 weight percent of the cellulose ester, wherein a degree of substitution within the cellulose mixed ester is from 2 to 3,
   B. applying the coating composition to a substrate so that an uncured coating is formed, and
   C. baking the uncured coating, whereby a cured coating is formed.

18. A process for coating a substrate as described in claim 17, wherein the coating composition is a waterborne coating composition.

19. A process as described in claim 17, wherein the coating composition further comprises flake pigments.

20. A coated substrate, wherein the coating comprises at least one coating layer comprising a flake pigment at least one member selected from the group consisting of:
   A. a condensation product formed by the reaction of a cellulose mixed ester having a number average molecular weight of between 5,000 and 100,000, with a crosslinker having at least two functional sites, wherein the cellulose mixed ester comprises:
      i. a first residue that is a residue of a cyclic dicarboxylic acid anhydride, present in an amount of from 3 to 35 weight percent of the cellulose ester;
      ii. a second residue, wherein the second residue is at least one member selected from the group consisting of:
         a. an oleophilic monocarboxylic acid residue, that is at least one member selected from the group consisting of residues of monocarboxylic acids having at least 3 carbon atoms, wherein the oleophilic monocarboxylic acid residue is present in an amount of from 10 to 65 weight percent of the cellulose ester;
         b. a hydrophilic monocarboxylic acid residue that is a residue of acetic acid, wherein the hydrophilic monocarboxylic acid residue is present in an amount of from 1 to 45 weight percent of the cellulose ester,
      wherein a degree of substitution within the cellulose mixed ester is from 2 to 3, and
   B. a cellulose mixed ester, wherein the cellulose mixed ester comprises:
      i. a first residue that is a residue of a cyclic dicarboxylic acid anhydride, present in an amount of from 3 to 35 weight percent of the cellulose ester;
      ii. a second residue, wherein the second residue is at least one member selected from the group consisting of:
         a. an oleophilic monocarboxylic acid residue that is at least one member selected from the group consisting of residues of monocarboxylic acids having at least 3 carbon atoms, wherein the oleophilic monocarboxylic acid residue is present in an amount of from 10 to 65 weight percent of the cellulose ester;
         b. a hydrophilic monocarboxylic acid residue that is a residue of acetic acid, wherein the hydrophilic monocarboxylic acid residue is present in an amount of from 1 to 45 weight percent of the cellulose ester,
      wherein a degree of substitution within the cellulose mixed ester is from 2 to 3.

21. A coated substrate according to claim 20, wherein the crosslinker has at least one functionality selected from the group consisting of: oxirane, carboxylic acid, acid anhydride of a carboxylic acid, isocyanate, blocked isocyanate, hydroxyl, imino, imino alcohol, or imino ether.

22. A coated substrate according to claim 20, wherein the flake pigment is selected from the group consisting of: aluminum pigments and mica pigments, and wherein a sufficient amount of cellulose mixed ester is used to impart a metallic appearance to the cured coating formed which can be measured by goniospectrophotometry as a C value of at least 170.

23. A coated substrate according to claim 20, wherein the cellulose mixed ester comprises:
   A. a succinic acid residue content of from 3 to 17 weight percent of the cellulose mixed ester,
   B. an acetyl residue content of from 1.5 to 15 weight percent of the cellulose mixed ester; and
   C. a butyryl residue content of from 25 to 55 weight percent of the cellulose mixed ester.

24. A coated substrate according to claim 20, wherein the cellulose mixed ester comprises:
   A succinic acid residue content of from 8 to 17 weight percent of the cellulose mixed ester;

B. an acetyl residue content of from 7 to 15 weight percent of the cellulose mixed ester, and C. a butyryl residue content of from 25 to 46 weight percent of the cellulose mixed ester.

25. A coated substrate according to claim 20, wherein the cellulose mixed ester comprises:

A. a succinic acid residue content of about 16 weight percent of the cellulose mixed ester, B. an acetyl residue content of about 11 weight percent of the cellulose mixed ester, and C. a butyryl residue content of about 27 weight percent of the cellulose mixed ester.

26. A coated substrate according to claim 20, wherein the cellulose mixed ester comprises:

A. a succinic acid residue content of about 9 weight percent of the cellulose mixed ester, B. an acetyl residue content of about 1 weight percent of the cellulose mixed ester, and C. a butyryl residue content of about 42 weight percent of the cellulose mixed ester.

27. A coated substrate according to claim 20, wherein at least one number of the group consisting of: the cellulose mixed ester and the residue of the cellulose mixed ester is present in an amount of 5 to 25 weight percent of the total weight of: (1) the cellulose mixed ester, (2) the condensation product formed by the reaction of a cellulose mixed ester with a reactant and (3) any other components that were reacted to form the cured coating.

* * * * *